United States Patent [19]

Yoneda

[11] Patent Number: 4,515,462
[45] Date of Patent: May 7, 1985

[54] METHOD AND APPARATUS FOR FORMING MULTICOLOR IMAGE

[75] Inventor: Hitoshi Yoneda, Yokohama, Japan

[73] Assignee: Tokyo Shibaura Denki Kabushiki Kaisha, Kawasaki, Japan

[21] Appl. No.: 469,753

[22] Filed: Feb. 25, 1983

[30] Foreign Application Priority Data

Feb. 26, 1982 [JP] Japan .................. 57-29949

[51] Int. Cl.³ .................. G03G 13/01; G03G 15/01
[52] U.S. Cl. .................. 355/4; 430/42; 430/363
[58] Field of Search .......... 355/4, 77, 3 TE, 3 CH, 355/3 DD; 430/42, 43, 44, 46, 363, 365; 346/157

[56] References Cited

U.S. PATENT DOCUMENTS

| 4,068,938 | 1/1978 | Robertson | 355/4 |
| 4,106,870 | 8/1978 | Kondo | 430/42 |
| 4,255,505 | 3/1981 | Hanada | 430/42 |
| 4,281,051 | 7/1981 | Sakai | 430/46 |
| 4,308,330 | 12/1981 | Kaukeinen | 430/46 |
| 4,384,033 | 5/1983 | Sakai | 430/363 |
| 4,413,899 | 11/1983 | Karasawa | 355/4 |
| 4,422,405 | 12/1983 | Kasahara | 355/3 DD |

FOREIGN PATENT DOCUMENTS 0001619 10/1978 European Pat. Off.
54-143139 11/1979 Japan.

Primary Examiner—A. T. Grimley
Assistant Examiner—Carl Romano
Attorney, Agent, or Firm—Oblon, Fisher, Spivak, McClelland & Maier

[57] ABSTRACT

The invention provides an apparatus for forming a multicolor image, comprising a photoconductive drum which comprises a conductive substrate, and a photoconductive layer and a transparent insulating layer, a first charger to perform primary charging, a first light source to expose the entire surface of the photoconductive drum, a second charger to secondarily charge the transparent insulating layer at the second polarity, a second light source to emit light, an amount of which is controlled to have two levels in accordance with first and second color image data, a first developing unit to develop the first color image, a third light source to perform a second entire-surface exposure of the photoconductive drum, and a second developing unit to develop the second color image.

18 Claims, 21 Drawing Figures

METHOD AND APPARATUS FOR FORMING MULTICOLOR IMAGE

BACKGROUND OF THE INVENTION

The present invention relates to a method and an apparatus for forming a multicolor image with a laser.

Laser printers using techniques of electrophotography are known as nonimpact printers. A laser beam is modulated in accordance with image data and is then deflected to divide a two-dimensional image into pixels or picture elements which are formed on a photoconductive drum. Thereafter, an image is recorded by a known electrophotography process. In this case, the two-dimensional image data is divided into pixels and is recorded in the form of pixels, so that merging of different types of data into single data, data deletion, and a change in character size can be easily performed.

It is important in image recording to display a multicolor image in order to easily distinguish one type of information from another. For example, the ability to distinguish between format information, mark information and document information, and between main information and additional or supplementary information, has been demanded.

In order to satisfy the above-mentioned demands, a method is considered in which a unicolor image is formed each time the photoconductive drum is rotated by one revolution. For example, if the operator wishes to obtain a three-color image, a single copy or print of the desired image can be obtained by rotating the photoconductive drum three times. However, the printing speed achieved using this method is slower than that in the case of unicolor printing. In fact, a three-color printer requires three times the printing time required by a unicolor printer. Furthermore, in the three-color printer, highly precise color registration is required, thus resulting in a complicated mechanism.

In order to solve the above drawback, an apparatus is disclosed in Japanese Patent Disclosure (KOKAI) No. 54-143139 in which a three-color image can be obtained by a single revolution of a photoconductive drum. More particularly, latent image formation and development for respective colors are sequentially performed on the photoconductive drum while the photoconductive drum is rotated by one revolution. However, in the apparatus of this type, a plurality of laser scanning systems (laser beam sources, optical systems, modulators, and deflectors) must be used, and the apparatus becomes complex as a whole, large in size and expensive to manufacture.

A two-color PPC process is disclosed in Japanese Patent Disclosure (KOKAI) No. 54-143139, in which a photoconductive drum having two photoconductive layers with different chromatic sensitivities is used. According to this process, the image exposure and transfer processes are performed once while the drum is rotated by one revolution. However, this prior art is essentially different from the present invention in that the photoconductive drum has a plurality of photoconductive layers. In this prior art, since the plurality of photoconductive layers are overlaid upon each other, much attention must be paid to the combination of photoconductive layers, thus disabling a wide variety of applications.

SUMMARY OF THE INVENTION

It is a first object of the present invention to provide a method for forming a multicolor image at high speed in accordance with a simple process.

It is a second object of the present invention to provide a simple, compact and low-cost apparatus for forming a multicolor image, wherein the multicolor image can be formed at high speed.

In order to achieve the first object of the present invention, a photoconductive drum is primarily charged at a first polarity and is completely exposed. The photoconductive drum comprises a conductive substrate, and a photoconductive layer and a transparent insulating layer which are sequentially formed on the conductive substrate. Thereafter, the photoconductive drum is secondarily charged at a second polarity. In the next step, light is radiated onto a predetermined surface portion of the photoconductive drum. Note that the amount of light is controlled at two levels in accordance with first and second color image data. A prospective first-color image formation portion of the surface of the photoconductive drum has a potential of the first polarity, and a first color image is then developed. Thereafter, a second exposure is performed for the entire surface of the photoconductive drum, a prospective second-color image formation portion whereof has a potential at the first polarity, and a second color image is developed.

In order to achieve the second object of the present invention, there is provided an apparatus for forming a multicolor image, comprising:

a photoconductive drum which has a conductive substrate, and a photoconductive layer and a transparent insulating layer which are sequentially formed on said conductive substrate;

a first charger disposed at a predetermined position above said photoconductive drum to perform primary charging at a first polarity, thereby setting said photoconductive drum at a predetermined potential;

a first light source disposed in front of said first charger along a rotational direction of said photoconductive drum to perform a first exposure for an entire surface of said photoconductive drum, thereby transferring a charge of a second polarity from said conductive substrate to said photoconductive layer;

a second charger disposed in front of said first light source along the rotational direction of said photoconductive drum to secondarily charge said photoconductive drum at the second polarity;

a second light source disposed in front of said second charger along the rotational direction of said photoconductive drum to emit light, an amount of which is controlled to have two levels in accordance with first and second color image data, thereby radiating the light onto prospective first- and second-color image formation portions of a surface of said photoconductive drum, said second light source being adapted to invert a polarity of a surface portion of said photoconductive drum which corresponds to said prospective first-color image formation portion to the first polarity, and to set a remaining surface portion of said photoconductive drum at a predetermined potential of the second polarity;

a first developing unit disposed in front of said second light source along the rotational direction of said photoconductive drum to develop a first color image;

a third light source disposed in front of said first developing unit along the rotational direction of said photoconductive drum to perform a second exposure for the entire surface of said photoconductive drum, thereby setting a surface portion of said photoconductive drum which corresponds to said prospective second-color image formation portion at a potential of the first polarity; and a second developing unit disposed in front of said third light source along the rotational direction of said photoconductive drum to develop a second color image.

Furthermore, when a second-color toner of the first polarity is applied to the surface portion of the transparent insulating layer which corresponds to the prospective second-color image formation portion and which has the maximum absolute potential and the same polarity as in the secondary charging and when the second-color image is developed, the number of exposure operations can be decreased by one.

BRIEF DESCRIPTION OF THE DRAWINGS

Other objects and advantages will be apparent from the following description taken in conjunction with the accompanying drawings, in which.

DETAILED DESCRIPTION OF THE PREFERRED EMBODIMENTS

A multicolor image formation apparatus according to a first embodiment of the present invention will be described with reference to FIGS. 1 and 2.

Figure 1:
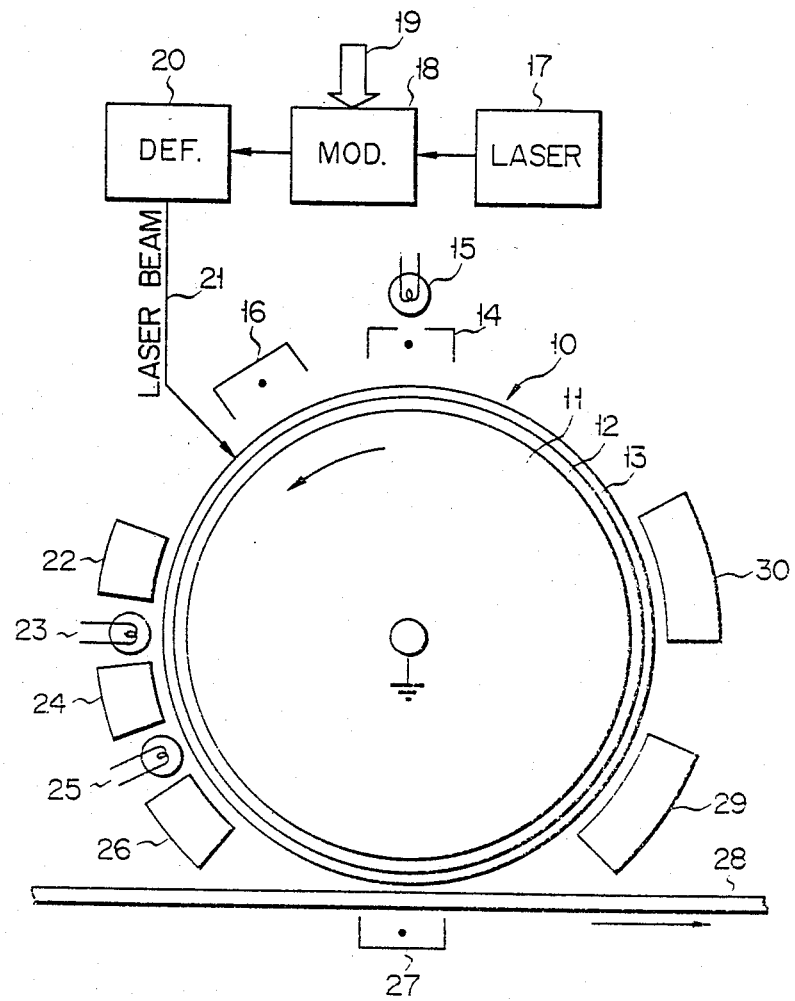
FIG. 1 is a schematic view of a multicolor image formation apparatus according to a first embodiment of the present invention.
Figure 2:
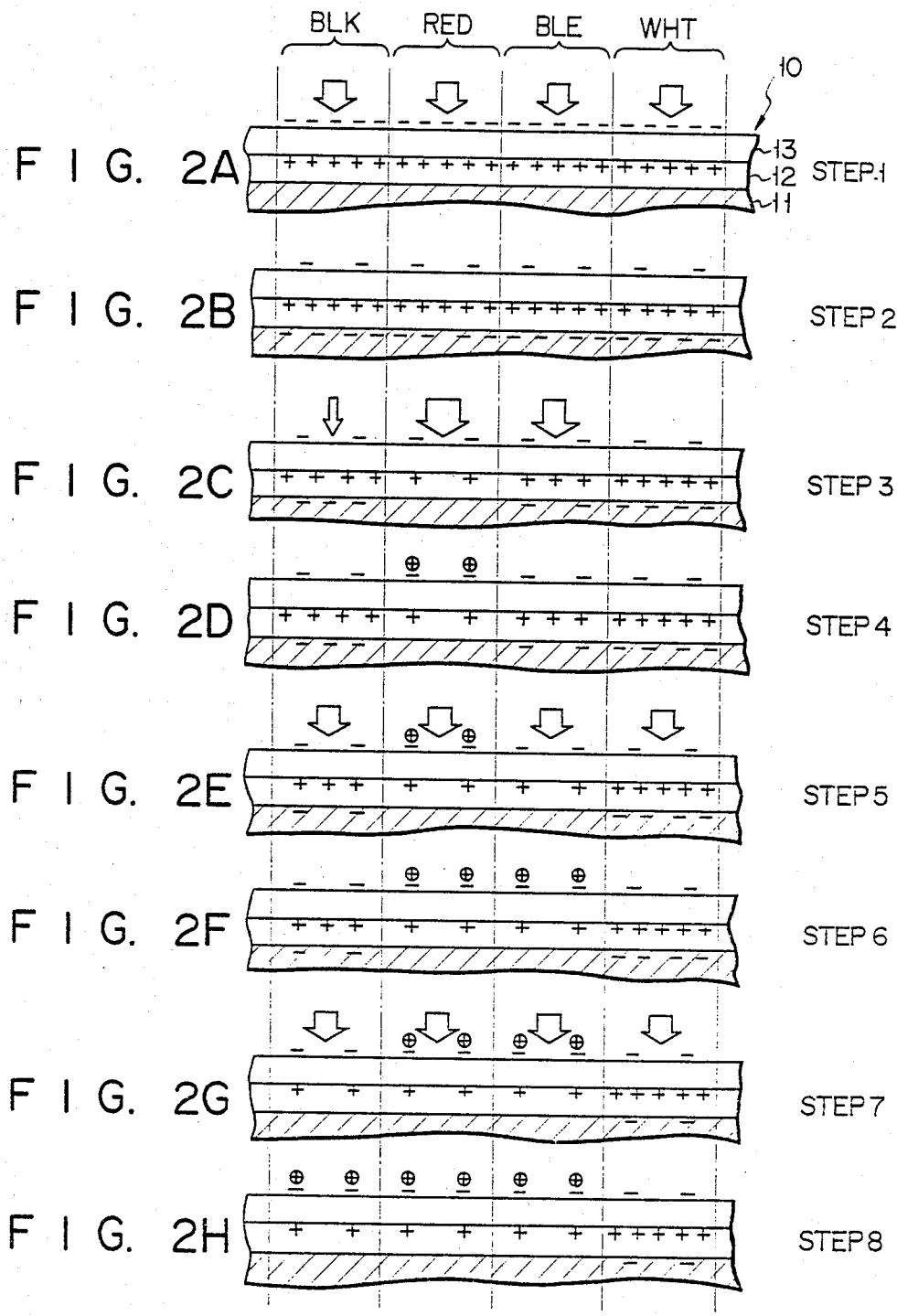
FIGS. 2A through 2H are sectional views of a photoconductive drum of the apparatus shown in FIG. 1 so as to explain the multicolor image formation steps.

FIG. 1 shows a schematic arrangement of the multicolor image formation apparatus (three-color printer) according to the first embodiment of the present invention, and FIGS. 2A to 2H show steps for forming a multicolor image using the apparatus shown in FIG. 1. A photoconductive drum 10 comprises a conductive substrate 11, and a photoconductive layer 12 and a transparent insulating layer 13 which are sequentially formed on the conductive substrate 11. The conductive substrate 11 is kept at zero potential.

When the operator wishes to form a three-color image, the photoconductive drum 10 is rotated in the direction indicated by the arrow. At the same time, a first charger 14 and a first lamp 15 are operated to respectively primarily charge the photoconductive drum 10 at, for example, the negative polarity, and to expose the entire surface of the photoconductive drum 10 for a first time, as shown in FIG. 2A. The entire surface of the photoconductive layer 12 is rendered conductive, so that positive carriers are injected from the conductive substrate 11 to the photoconductive layer 12 and are distributed at the interface between the photoconductive layer 12 and the transparent insulating layer 13.

The photoconductive drum 10 is then secondarily charged by a second charger 16 to have a polarity (e.g., positive polarity) opposite to that of the primary charge. The surface potential of the photoconductive drum 10 is inverted from the negative potential to the positive potential, as shown in FIG. 2B. The surface potential of the photoconductive drum 10 is not determined by the polarity of the carrier on the transparent insulating layer 13, but by the charge distribution of the photoconductive layer 12, the transparent insulating layer 13 and the conductive substrate 11.

The photoconductive drum 10 is then exposed by laser beams 21 the intensity of which may be changed in four levels, respectively. The laser beams from a laser beam source 17 are modulated by a beam modulator 18 to have intensities respectively corresponding to color levels of three colors in accordance with image data 19. The laser beams are then deflected by a deflector 20 and are incident on the photoconductive drum 10 so as to axially scan the photoconductive drum 10. If the laser beam source 17 comprises a source such as a semiconductor laser which can be directly modulated, the beam modulator 18 may be omitted. The intensity of the modulated laser beam for red (first color) pixels is the greatest among the intensities of the laser beams; the intensity of the modulated laser beam for blue (second color) pixels is the next greatest; the intensity of the modulated laser beam for black pixels is the third greatest; and the intensity of the modulated laser beam for colorless (white) pixels is the smallest.

A portion of the photoconductive layer 12 which corresponds to a red image formation portion RED is rendered completely conductive, as shown in FIG. 2C. No carriers are present at the interface between the conductive substrate 11 and the photoconductive layer 12. The surface potential of the photoconductive drum 10 becomes negative. A portion of the photoconductive layer 12 which corresponds to a blue image formation portion BLE is rendered intermediately conductive, so that the carriers are partially left in the interface between the conductive substrate 11 and the photoconductive layer 12. The potential of the photoconductive drum 10 is substantially zero. A portion of the photoconductive layer 12 which corresponds to a black image formation portion BLK is only slightly discharged. Although the surface potential of the photoconductive drum 10 is accordingly decreased, it remains positive. Furthermore, a portion of the photoconductive layer 12 which corresponds to a white color image formation portion WHT is not exposed at all, so that the surface potential of the photoconductive drum 10 remains positive. In this condition, the red image is developed by a first developing unit 22 using a positively charged red toner (FIG. 2D).

Second exposure is then performed by a second lamp 23 on the entire surface of the photoconductive drum 10. The surface potential of the portion of the photoconductive drum 10 corresponding to the blue image formation portion BLE is negative, as shown in FIG. 2E. The charge distribution of the blue image formation portion BLE is the same as that of the red image formation section RED prior to the red image development.

The black image formation portion BLK and the white image formation portion WHT are respectively the same as the blue image formation portion BLE and the black image formation portion BLK prior to the red image development. The surface potentials of the portions of the photoconductive drum 10 corresponding to the black and white image formation portions BLK and WHT are zero and positive, respectively. In this condition, the blue image is developed by a second developing unit 24 using a positively charged blue toner, as shown in FIG. 2F.

Third exposure is then performed by a third lamp 25 on the entire surface of the photoconductive drum 10 to set the surface potential of the portion of the photoconductive drum 10 corresponding to the black image formation portion BLK to a negative potential, as shown in FIG. 2G. In this case, the charge distribution of the black image formation portion BLK is the same as that of the red image formation portion RED prior to the red image development. Furthermore, the charge distribution of the white image formation portion WHT is the same as that of the black image formation portion BLK prior to the blue image development. The surface potential of the portion of the photoconductive drum 10 corresponding to the white image formation portion WHT is zero. In this condition, the black image is developed by a third developing unit 26 using a positively charged black toner, as shown in FIG. 2H.

Figure 3:
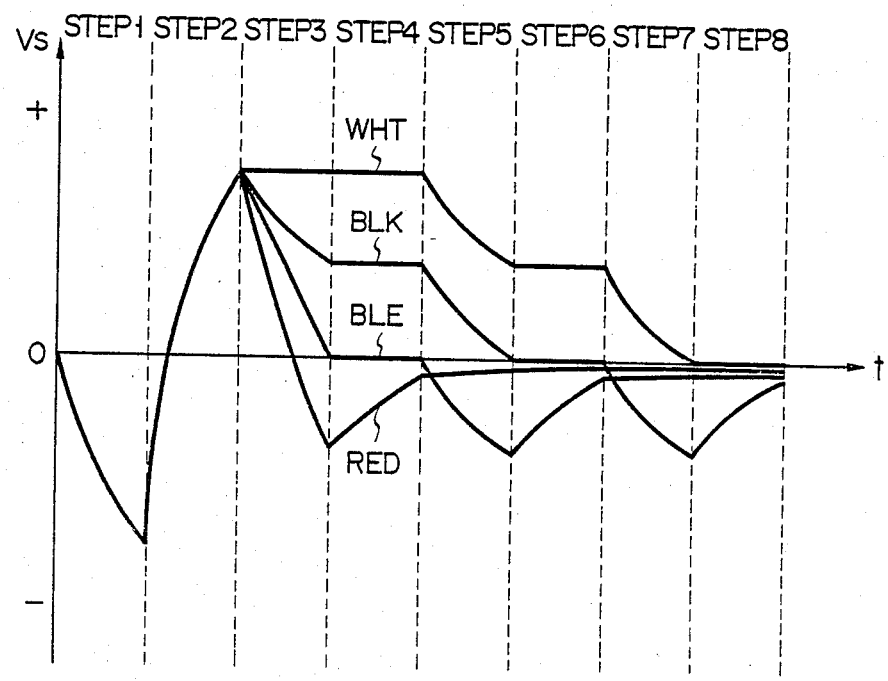
FIG. 3 is a graph for explaining the surface potential $V_S$ of the photoconductive drum of the apparatus shown in FIG. 1 as a function of time.
Figure 4:
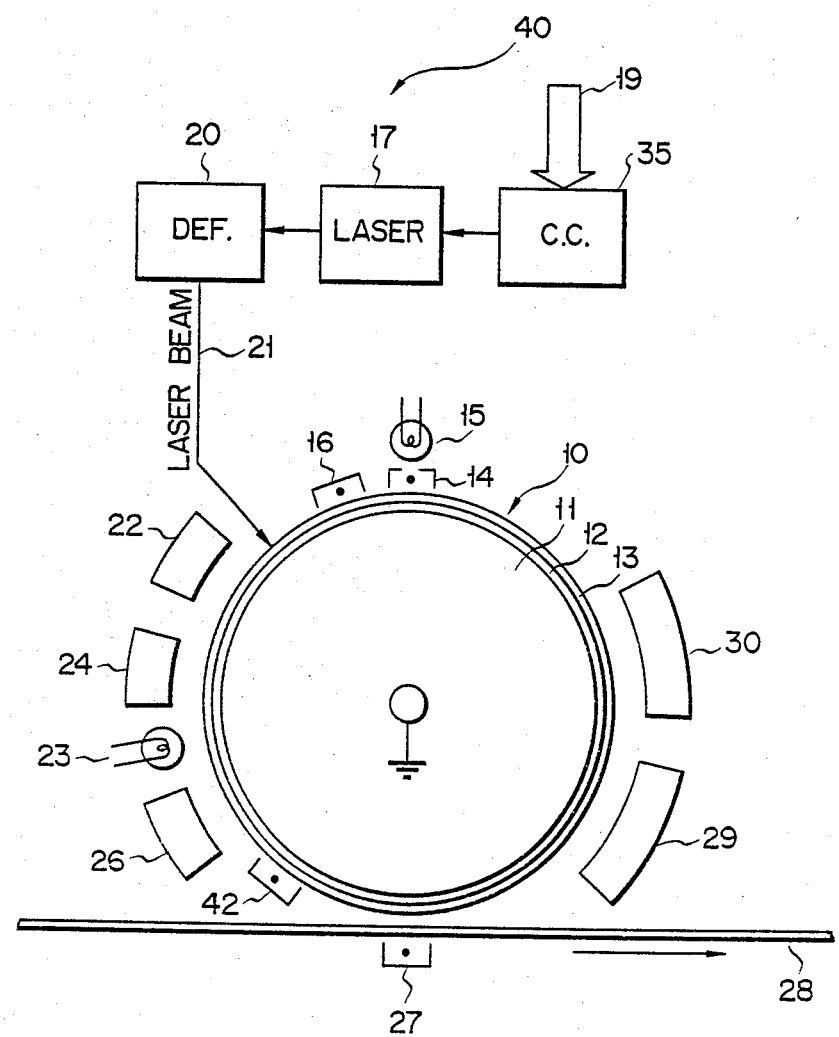
FIG. 4 is a schematic view of a multicolor image formation apparatus according to a second embodiment of the present invention.

In this manner, a three-color image of red, blue and black is formed on the photoconductive drum 10. A change in surface potential $V_s$ of the photoconductive drum 10 as a function of time corresponding to the steps in FIGS. 2A to 2H is shown in FIG. 3.

The three-color image formed on the photoconductive drum 10 is transferred by a third charger 27 of the negative polarity, i.e., opposite to that of the toners, to a recording paper sheet 28. The image on the recording paper sheet 28 is then fixed by a fixing unit (not shown), thus providing a three-color print. The photoconductive drum 10 after the transfer process passes through a discharge station 29, and a cleaning station 30. As a result, the photoconductive drum 10 is discharged and cleaned in readiness for a subsequent printing operation.

The multicolor image formation apparatus will be described more in detail. The Se-Te photoconductive layer 12 is formed on the Al conductive substrate 11 to a thickness of 50 μm. The transparent insulating layer 13 is formed of Myler (trade name: polyethylene terephthalate), and is formed on the photoconductive layer 12 to a thickness of 20 μm. As a result, a three-layer photoconductive drum 10 is formed. Primary charging of the photoconductive drum 10 is performed by the first charger 14 at a voltage of −7.5 kV. Therefore, the surface potential of the photoconductive drum 10 is kept at −1,000 V. The entire surface of the photoconductive drum 10 is exposed at an exposure of 10 lux·sec. A voltage of +6 kV is applied across the secondary charger 16 to invert the surface potential of the photoconductive drum 10 to a voltage of +500 V. In this condition, the red image formation portion RED, the blue image formation portion BLE, and the black image formation portion BLK receive energies of 15 erg/cm², 10 erg/cm² and 5 erg/cm², respectively, from a 15 mW semiconductor laser which emits a beam having a wavelength of 820 nm. Latent images are formed on the red image formation portion at −250 V, on the blue image formation portion at 0 V, on the black image formation portion at +250 V, and on the white image formation portion at +500 V. In this condition, the development bias voltage of the first developing unit 22 is kept at −50 V to form the red image using the positively charged red toner. Subsequently, a white light source with a red filter (latten No. 25) is used as the second lamp 23. Any type of filter may be selected in dependence on the characteristic of the photoconductive layer 12. The entire surface of the photoconductive drum 10 is exposed at an exposure of 10 lux·sec. The blue image formation portion, the black image formation portion, and the white image formation portion are kept at potentials of −250 V, 0 V and +250 V, respectively. In this condition, the development bias voltage of the second developing unit 24 is kept at −70 V, while development is performed using the positively charged blue toner. In the same manner as described above, a white light source with a red filter is used as the third lamp 25. The entire surface of the photoconductive drum 10 is exposed as the third entire exposure at an exposure of 5 lux·sec. The black image formation portion and the white image formation portion are kept at potentials of −250 V and 0 V, respectively. In this condition, a development bias voltage of −90 V is applied across the third developing unit 26 to develop the black image using a positively charged black toner. As a result, a three-color umage of red, blue and black is formed on the photoconductive drum 10. The toner image is then transferred onto a recording paper sheet by a known electrophotography process. The three-color print is thus obtained.

As described above, the laser beam printer of the first embodiment has the following advantages:

(1) Since one laser exposure is required for one recording operation, only one laser optical system is required.

(2) Since one transfer process is performed every time the photoconductive drum is rotated by one revolution, the recording speed is the same as that of unicolor recording.

(3) Since the structure of the apparatus and the image forming process are simplified, a compact and low-cost apparatus can be obtained.

Furthermore, a colorless portion (e.g., white portion which is the most part of a general document) need not be exposed with the laser beams in the above embodiment, the laser beam source has a long service life.

Furthermore, in the above embodiment, a three-color laser printer is exemplified. However, the present invention may also be applied to a two-color laser printer. In the two-color laser printer, laser beams of a intensity corresponding to three levels are used to expose the photoconductive drum 10, and the first-color exposure is performed. Thereafter, the entire surface of the photoconductive drum 10 is exposed to set the second-color image formation section at a potential having the same polarity as that of the first charge. The second-color development is then performed.

An apparatus and a method for forming a multicolor image will be described with reference to FIG. 4 and FIGS. 5A to 5G. The multicolor image forming apparatus (laser printer) shown in FIG. 4 comprises: a three-layer photoconductive drum 10 on which an electrostatic latent image is to be formed; an image forming optical system 40 for supplying, to the photoconductive drum 10, an amount of light corresponding to the image to be formed on the photoconductive drum 10; a first lamp 15 for adjusting the charge distribution on the surface of the photoconductive drum 10 before the electrostatic latent images are formed thereon; first and second chargers 14 and 16; first to third developing units 22, 24 and 26 for developing the electrostatic latent images; a second lamp 23 for exposing the entire surface of the photoconductive drum 10 after the second-color image is developed by the second developing unit 24; a third charger 42 for adjusting the polarity of the toner after development; a fourth charger 27 for transferring a toner image having a different polarity to a recording paper sheet 28; and discharge and cleaning stations 29 and 30 which respectively discharge and clean the photoconductive drum 10 after the transfer process, in readiness for a subsequent copying operation. The photoconductive drum 10 comprises an aluminum conductive substrate 11, an Se-Te photoconductive layer 12 which is formed on the conductive substrate 11 to a thickness of 50 μm, and a transparent insulating film 13 comprising Myler (trade name: polyethylene terephthalate) which is formed on the photoconductive layer 12 to a thickness of 20 μm.

The image forming optical system 40 comprises a semiconductor laser 17 and a deflector 20 for deflecting output laser beams from the semiconductor laser 17 so as to allow the beams to axially scan the photoconductive drum 10. The output light beam from the semiconductor laser 17 is determined by a current flowing therethrough in accordance with recording image data 19. The current is regulated by a control circuit 35.

Figure 5:
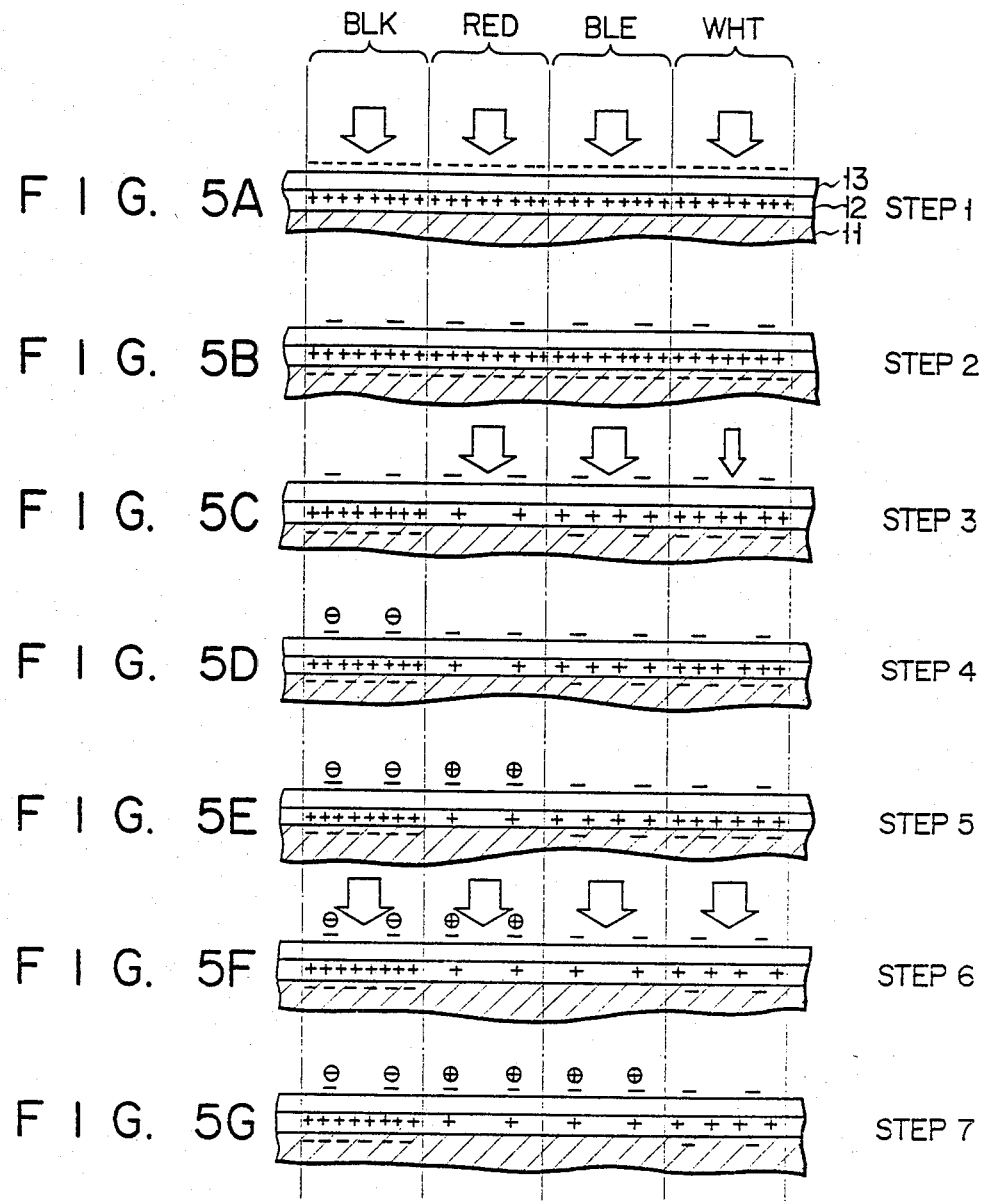
FIGS. 5A through 5G are sectional views of a photoconductive drum of the apparatus shown in FIG. 4 so as to explain the multicolor image formation steps.

The mode of operation of the laser beam printer having the arrangement described above will be described hereinafter. In step 1, primary charging and entire-surface exposure are performed. A voltage of −7.5 kV is applied across the first charger 14 so as to maintain the surface potential of the photoconductive drum 10 at −1,000 V. In other words, negative carriers are induced on the surface of the transparent insulating layer 13. At the same time, positive carriers which balance these negative carriers are induced on the conductive substrate 11, and the entire surface of the photoconductive drum 10 is exposed by the first lamp 15. The photoconductive layer 12 is then rendered conductive, and the positive carriers of the conductive substrate 11 are injected into the photoconductive layer 12. The positive carriers are distributed in the interface between the transparent insulating layer 13 and the photoconductive layer 12, as shown in FIG. 5A.

In step 2, secondary charging is performed such that a voltage of +6 kV is applied across the second charger 16 in a dark place. The surface potential of the photoconductive drum 10 is changed from the negative polarity to the positive polarity (+500 V). At the same time, negative carriers are induced in the conductive layer 11.

The secondary charging is performed in the dark place, so that the carriers of the photoconductive layer 12 are left unchanged. The charge distribution is shown in FIG. 5B.

In this condition, an image exposure is performed as step 3. This image exposure is performed using laser beams from the semiconductor laser 17. The power of the output from the semiconductor laser 17 is 15 mW, and the wavelength of the laser beam is 820 nm. A given current flows in the semiconductor laser 17 in accordance with a given color of the recording image. In this manner, the intensity of the output laser beam varies in accordance with the intensity of current. In this embodiment, the laser beam intensities for the red image formation portion, the blue image formation portion and the white image formation portion are 15 erg/cm$^2$, 10 erg/cm$^2$ and 5 erg/cm$^2$, respectively. It is noted that the black image formation portion is not exposed. The laser beam spot corresponds to a pixel. Each pixel is then scanned with the laser beam spot, thus obtaining an image. This scanning operation can be performed incorporating the deflector 20.

The charge distribution of the photosensitive drum 10 after the image exposure described above is shown as step 3 in FIG. 5C. More specifically, the exposed portion of the photosensitive layer 12 is rendered conductive, so that the negative carriers of the conductive substrate 11 are injected into the photoconductive layer 12. The negative carriers cancel out the positive carriers in the photoconductive layer 12. The degree of cancellation described above depends on the laser beam intensity. As previously mentioned, the amount of light decreases in the red, blue and white image formation portions in the order named. Therefore, the number of carriers of the photoconductive layer 12 and the conductive substrate 11 decreases in the above order. It is noted that the charge distribution on the surface of the transparent insulating layer 13 remains unchanged.

In general, the internal charge of the photoconductive drum 10 is distributed in a given pattern. However, the actual distribution may not appear on the surface. A sum of vectors based on the charge distribution appears on the surface. For example, in the image exposure shown in FIG. 5C, in the black image formation portion BLK, the electric field formed between the negative carriers in the conductive substrate 11 and the positive carriers in the photoconductive layer 12 is greater than that formed between the negative carriers on the surface of the transparent insulating layer 13 and the positive carriers in the photoconductive layer 12. Therefore, when observed from the outside, a positive potential may be measured on the surface of the photoconductive drum 10. In this embodiment, the surface potential of the photoconductive drum 10 is +500 V.

In the same manner, in the blue image formation portion BLE, the positive carriers of the photoconductive layer 12 and the negative carriers of the conductive substrate 11 are reduced in number, so that an electric field toward the transparent insulating layer 13 is weakened. In this embodiment, the electric field toward the photoconductive layer 12 is cancelled, so that the surface potential in this portion is 0 V.

The amount of light received at the time of image exposure is largest in the red image formation portion RED. The carriers in the photoconductive layer 12 and the conductive substrate 11 are further reduced in number. In this embodiment, the surface potential of the image formation portion RED is −250 V.

In the white image formation portion WHT, the amount of light received at the time of image exposure is smallest. In this embodiment, the surface potential in this image formation portion is +250 V.

Figure 6:
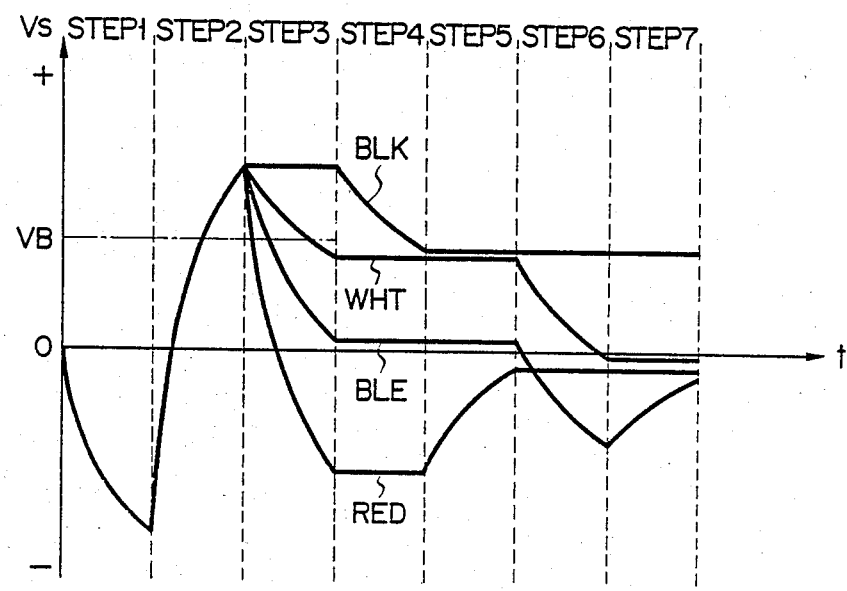
FIG. 6 is a graph for explaining the surface potential $V_S$ of a transparent insulating layer of the photoconductive drum of the apparatus shown in FIG. 4 as a function of time.

After the image exposure described above, the surface potential of the photoconductive drum 10 may be divided into four levels, as shown in step 3 of FIG. 6. The potentials of the black, white, blue and red image formation portions BLK, WHT, BLE and RED gradually decrease in the order named. The above description is the step of forming the electrostatic latent images in accordance with the recording image.

In step 4, the black image formation portion, that is, the portion having the highest potential, is developed using the black toner. This development is performed by the first developing unit using the negatively charged black toner, where the development bias voltage $V_B$ of the first developing unit is kept at +270 V. The development bias voltage $V_B$ must be higher than the surface potential of the white image formation portion which is the second highest latent image potential (+250 V). In this manner, the black image is formed as a visible image using the negatively charged black toner. In this case, since the potential of this portion differs greatly from that of any other portion, highly precise development can be performed.

In step 5, the red image formation portion RED is developed by the second developing unit 24 using the positively charged red toner. In this case, the development bias potential $V_B$ is −50 V. Therefore, the red toner is applied only to the red image formation portion RED, thus obtaining the red image.

In step 6, the entire surface of the photoconductive drum 10 is exposed by the second lamp 23. The second lamp 23 comprises a white light source which provides an exposure of 3 lux sec. This light does not reach the inside of the photoconductive drum 10 or the photoconductive layer 12 at the black and red image formation portions BLK and RED. However, the light reaches the photoconductive layer 12 at the blue and white image formation portions BLE and WHT. The corresponding portions of the photoconductive layer 12 are rendered conductive. Therefore, the carriers of the photoconductive layer 12 and the conductive substrate 11 cancel each other out at the blue and white image formation portions BLE and WHT. Therefore, the levels of surface potential of the photoconductive drum 10 at these portions decrease further. In this embodiment, as shown in step 6 of FIG. 6, the surface potential of the blue image formation portion BLE is −250 V, and the surface potential of the white image formation portion WHT is 0 V.

In step 7, the blue image formation portion BLE is developed by the third developing unit 26 using the positively charged blue toner. In this case, a bias voltage of −50 to −70 V is applied across the third developing unit 26. The positively charged blue toner is applied only to the blue image formation portion BLE, thus obtaining the blue image.

As may be apparent from the above description, a three-color image is visibly formed on the photoconductive drum 10, using the red, blue and black toners.

The polarities of the three toners are then controlled by the third charger 42 to have the same polarity. A voltage of +5.5 kV is applied across the third charger 42, and the toners are controlled to have the positive polarity.

Thereafter, the toner image or visible image on the photoconductive drum 10 is transferred by the fourth charger 27 to the recording paper sheet 28. The fourth charger 27 is disposed to oppose the photoconductive drum 10 through the recording paper sheet. A voltage of −6 kV is applied across the fourth charger 27. Therefore, an electric field is formed from the photoconductive drum 10 to the recording paper sheet 28, so that the toner image can be transferred to the recording paper sheet 28.

After the transfer process, the image on the recording paper sheet 28 is fixed by a fixing unit (not shown), thereby obtaining a three-color image on the recording paper sheet 28.

The photoconductive drum 10 is then discharged and cleaned in readiness for a subsequent copying operation. More particularly, the internal charge of the photoconductive drum 10 is discharged by the discharge station 29. Furthermore, the surface of the photoconductive drum 10 is cleaned by the cleaning station 30. The photoconductive drum 10 is then ready for the next copying operation.

As described above, the laser beam printer of the second embodiment has the following advantages:

(1) Since laser exposure is only required once for each copying operation, only one laser optical system is required.

(2) Since the transfer process can be performed each time the photoconductive drum is rotated by one revolution, the recording speed is the same as that of unicolor recording.

(3) Since electrostatic latent images of positive and negative polarities are formed, a difference between the surface potentials is great.

(4) The number of entire exposure operations is decreased by one as compared with the method described with reference to the first embodiment.

(5) Since the structure and the image forming process are simplified, a compact and low-cost apparatus can be manufactured.

In the second embodiment described above, the development of the black image formation portion cannot of necessity be carried out as a first step after the laser beams are radiated onto the photoconductive drum. The development of the black image formation portion may be performed after the development of the red image formation portion or the blue image formation portion.

Figure 7:
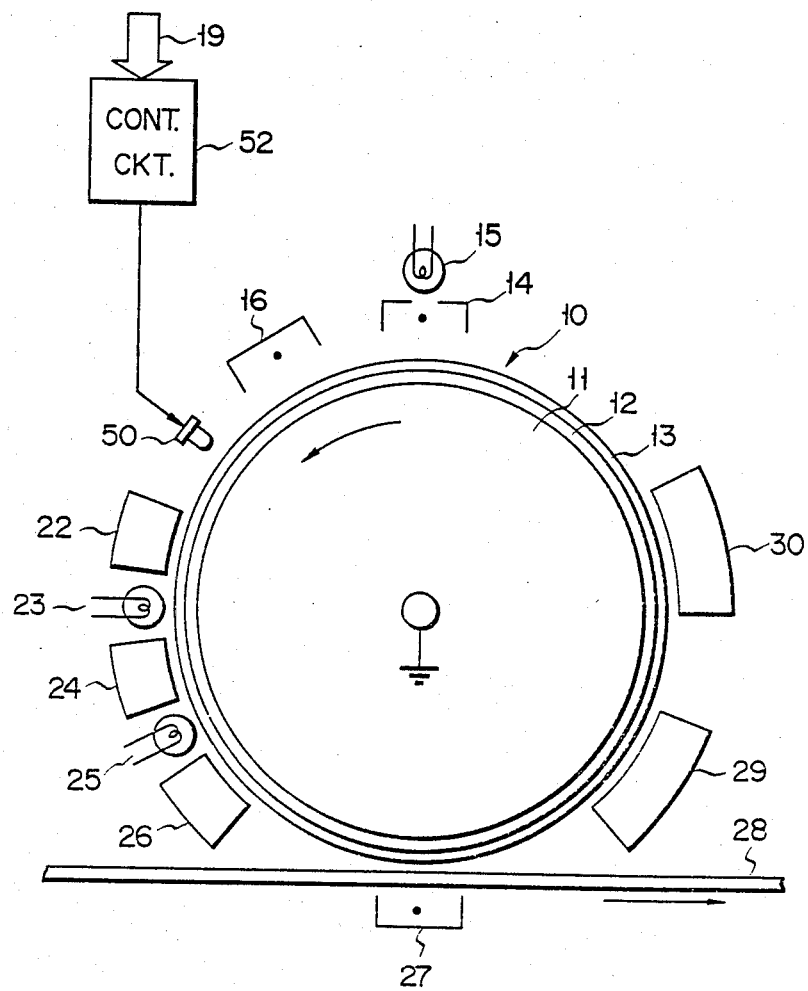
FIGS. 7 and 8 are schematic views of multicolor image formation apparatuses according to further embodiments of the present invention.

A multicolor image forming apparatus according to a third embodiment of the present invention will be described with reference to FIG. 7. In this embodiment, a plurality of LEDs (light-emitting diode) 50 are used as light sources for exposing a photoconductive drum 10 so as to form electrostatic latent images thereon. The LEDs 50 are axially aligned along the photoconductive drum 10 in the vicinity of a second charger 16. The amounts of light from the LEDs 50 are controlled by a control circuit 52 to which image data 19 is supplied. The light rays from the LEDs 50 are used to form, as color information, electrostatic latent images on the photoconductive drum 10. Any other arrangement of the multicolor image forming apparatus of the third embodiment is the same as for that of the first embodiment. The same reference numerals as used in FIG. 1 denote the same parts in FIG. 7, and a detailed description thereof is omitted.

Figure 8:
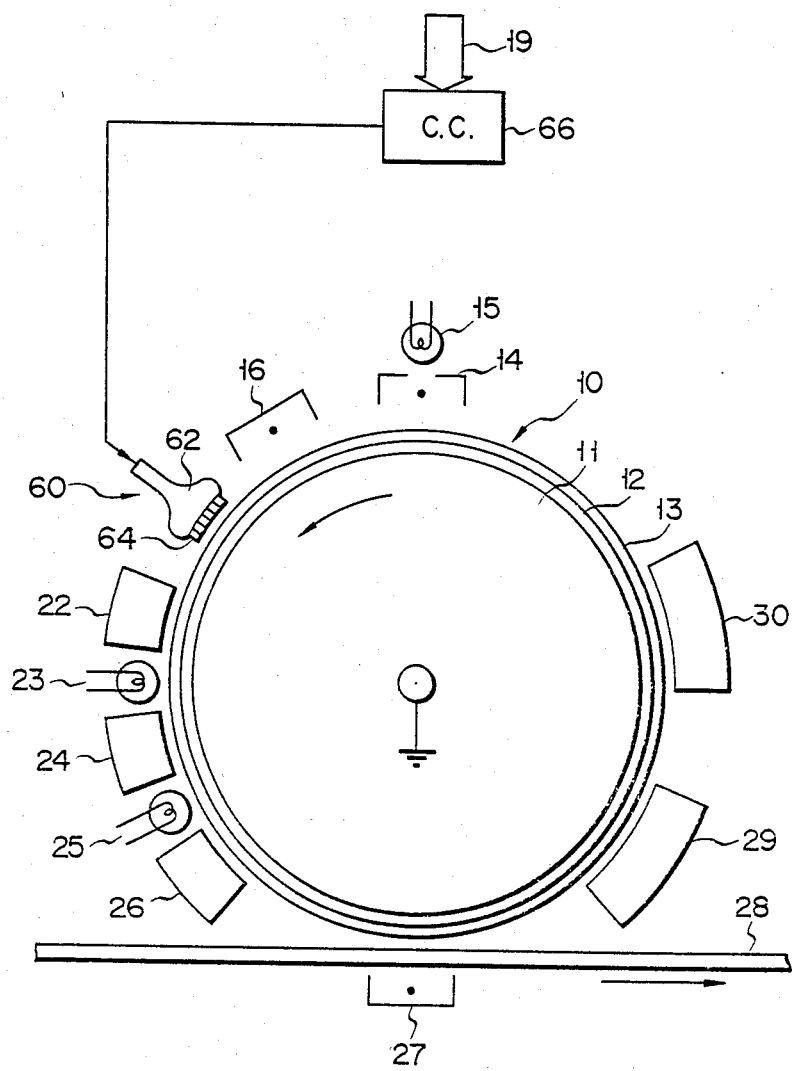

A multicolor image forming apparatus according to a fourth embodiment of the present invention will be described with reference to FIG. 8. In this embodiment, an optical fiber tube 60 is disposed as a means for exposing a photosensitive drum 10 to form electrostatic latent images thereon.

It is known that the optical fiber tube 60 has a structure in which an optical fiber plate 64 is mounted on a faceplate of an electron tube 62. The optical fiber tube 60 is disposed to be in tight contact with the photoconductive drum 10. In the electron tube, the electron beams are line-scanned. The intensities of the electron beams are controlled in response to the electrical signals from a control circuit 66 in accordance with the image data 19. The scanned electron beams cause luminescence on the phosphor screen. The light is transmitted from the optical fiber plate 64 to the photoconductive drum 10 without dispersion.

The image data transmitted by the optical fiber tube 60 is recorded as an electrostatic latent image on the photoconductive drum 10 in accordance with the light intensity. Any other arrangement of the apparatus of the fourth embodiment of the present invention is the same as for that of the first embodiment. The same reference numerals as used in FIG. 1 denote the same parts in FIG. 8, and a detailed description thereof is omitted.

The present invention is not limited to the above embodiments. Various modifications may be made as follows. In the above embodiments, the laser beam exposure is performed after the secondary charging. However, the second charger 16 may be modified to be as the same as the first charger. In this case, secondary charging may be performed simultaneously when laser beam exposure is performed, thereby obtaining the same effects as in the above embodiments. Furthermore, in the above embodiments, an Se-Te photoconductive layer 12 is used, so that primary charging is performed using negative carriers. However, when the photoconductive layer 12 comprises CdS or OPC, primary charging may be performed using positive carriers, while secondary charging may be performed using negative carrier. In this manner, various types of photoconductive layers may be utilized.

When a CdS photoconductive layer 12 is used, the entire-surface exposure performed simultaneously with or subsequently to primary charging need not be performed. More specifically, the secondary charging at the polarity opposite to that of the primary charging may be performed immediately after primary charging, thereby achieving the desired charge distributions of the conductive substrate 11, the photoconductive layer 12 and the transparent insulating layer 13 of the three-layer photoconductive drum 10. This is because the electrons may be easily injected at the interface between the CdS photoconductive layer 12 and the Al conductive substrate 11 (when these two materials are brought into contact with each other, a barrier therebetween is low and rectification characteristics are provided for carriers) and because the dark resistance of CdS is lower than that of the other material. Therefore, electron mobility toward the photoconductive layer 12 tends to increase even without performing the entire-surface exposure after the primary charging, although the formation of an electric field between the photoconductive layer 12 and the conductive substrate 11 is required for the above mobility.

In the above embodiments, the development operations are performed in the order of red, blue and black. However, the order of development operations is not limited to this, but may be changed as needed. However, the most preferable sequences are as follows:

(1) Images which have larger recording areas are preferably formed before images which have smaller recording areas.

(2) Light-colored images are preferably formed before dark-colored images.

If item (1) is satisfied, the differences between the surface potentials of the respective color images at the first development process are sufficiently large that complete recording can be performed. Furthermore, if item (2) is satisfied, the dark-colored image is formed over the light-colored image, thus emphasizing the contrast therebetween. Furthermore, a combination of the colors described above may be considered as needed. This is also true for the embodiments mentioned previously.

Furthermore, the present invention can be suitably applied to image formation in which the area of the black image formation portion is large. More specifically, since the laser beam printer does not perform exposure for the black image formation portion, the area which is subjected to exposure is small. As a result, the laser apparatus has a long service life.

In the laser beam printer of the present invention, the image data 19 is supplied to the modulator or the control circuit of the semiconductor laser. The image data comprises three types of color data which are respectively stored in color memories. The color memories store the color data in the form of binary data of "0" and "1". When the binary data are then counted, the area to be recorded can be measured. When the color portion having the largest area is selected to be free from laser exposure, the laser apparatus has an even longer service life.

Furthermore, when the intensity of the laser beam is changed as needed, or when a proper developing unit is selected as needed, various output modifications may be provided. Therefore, two-color printing which has only two desired colors, unicolor printing, and two-color or unicolor printing in which different data are printed out in the same color can be easily performed.

The latent image forming optical system 40 may comprise an LED or an optical fiber tube.

The three-layer photoconductive body may comprise a drum or an endless belt.

As may be apparent from the above description, a simple process for forming a multicolor image is provided according to the present invention. Furthermore, a compact apparatus for forming a multicolor image can be obtained. Various functional changes may be provided by changing the amount of light to be incident on the photoconductive drum.

What is claimed is:

1. A method for forming a multicolor image, comprising the steps of:

performing primary charging of a first polarity for a photoconductive drum comprising a conductive substrate, and a photoconductive layer and a transparent insulating layer formed on a conductive substrate, thereby producing a carrier of a first polarity on said transparent insulating layer and a carrier of a second polarity in said conductive substrate, and setting said photoconductive drum at a predetermined potential;

performing a first entire-surface exposure of said photoconductive drum so as to move said carrier of a second polarity from said conductive substrate to said photoconductive layer;

performing secondary charging of said photoconductive drum to invert a surface potential of said photoconductive drum;

radiating light beams onto first and second color image formation portions of said photoconductive drum, inverting a potential of a first surface portion of said photoconductive drum to a potential of the first polarity, and setting a potential of a second surface portion of said photoconductive drum to a predetermined potential of the second polarity, said light beams having light amount levels corresponding to first and second color image data, said first surface portion corresponding to the first color image formation portion, and said second surface portion corresponding to the second color image formation portion;

applying a first color toner of the second polarity to said first surface portion of said photoconductive drum, and developing the first color image;

performing a second entire-surface exposure of said photoconductive drum to set the second surface portion of said photoconductive drum at a potential of the first polarity; and applying a second color toner of the second polarity to said second surface portion of said photoconductive drum, and developing the second color image.

2. A method according to claim 1, wherein the step of performing primary charging to set said photoconductive drum at the predetermined potential, and the step of performing the first entire-surface exposure, are simultaneously performed.

3. A method according to claim 2, wherein the step of performing secondary charging, and the step of radiating light beams onto said photoconductive drum, are simultaneously performed.

4. A method for forming an n-color image, comprising the steps of:

performing primary charging of a first polarity for a photoconductive drum having a conductive substrate, and a photoconductive layer and a transparent insulating layer formed on said conductive substrate, thereby producing a carrier of a first polarity on said transparent insulating layer and a carrier of a second polarity in said conductive substrate, and setting said photoconductive drum at a predetermined potential;

performing a first entire-surface exposure of said photoconductive drum so as to move said carrier of a second polarity from said conductive substrate to said photoconductive layer;

performing secondary charging of said photoconductive drum to invert a surface potential of said photoconductive drum;

radiating light beams onto n color image formation portions of said photoconductive drum, inverting a potential of a first surface portion of said photoconductive drum to a potential of the first polarity, and setting a potential of remaining surface portions of said photoconductive drum to a potential of the second polarity at a predetermined potential, said light beams having light amount levels corresponding to n-color image data, said first surface portion corresponding to a first color image formation portion, said remaining surface portions corresponding to (n−1) color image formation portions;

applying a first color toner of the second polarity to said first surface portion of said photoconductive drum, and developing the first color image;

performing a kth (k=2, ..., n) entire-surface exposure of said photoconductive drum to set a kth surface portion of said photoconductive drum at a potential of the first polarity; and applying a kth color toner of the second polarity to said kth surface portion of said photoconductive drum, and developing the kth color image.

5. A method according to claim 4, wherein the step of performing primary charging to set said photoconductive drum at the predetermined potential, and the step of performing the first entire-surface exposure, are simultaneously performed.

6. A method according to claim 5, wherein the step of performing secondary charging, and the step of radiating the light beams whose light amount levels correspond to n-color image data onto said photoconductive drum, are simultaneously performed.

7. A method according to claim 4, wherein the step of performing secondary charging, and the step of radiating the light beams whose light amount levels correspond to n-color image data onto said photoconductive drum, are simultaneously performed.

8. An apparatus for forming a multicolor image, comprising:

a photoconductive drum which has a conductive substrate, and a photoconductive layer and a transparent insulating layer sequentially formed on said conductive substrate;

first charging means disposed at a predetermined position above said photoconductive drum to perform primary charging, thereby producing a carrier of a first polarity on said transparent insulating layer and a carrier of a second polarity in said conductive substrate, and setting said photoconductive drum at a predetermined potential;

first light source means disposed in front of said first charging means along a rotational direction of said photoconductive drum to expose an entire surface of said photoconductive drum, thereby transferring said carrier of a second polarity from said conductive substrate to said photoconductive layer;

second charging means disposed in front of said first light source means along the rotational direction of said photoconductive drum to secondarily charge said photoconductive drum at the second polarity;

second light source means disposed in front of said second charging means along the rotational direction of said photoconductive drum to emit light, an amount of which is controlled to have two levels in accordance with first and second color image data, thereby radiating the light onto prospective first- and second-color image formation portions of a surface of said photoconductive drum, said second light source means being adapted to invert a potential of a surface portion of said photoconductive drum which corresponds to said prospective first-color image formation portion to the first polarity, and to set a remaining surface portion of said photoconductive drum at a predetermined potential of the second polarity;

a first developing unit disposed in front of said second light source means along the rotational direction of said photoconductive drum to develop the first color image;

third light source means disposed in front of said first developing unit along the rotational direction of said photoconductive drum to perform a second entire-surface exposure of said photoconductive drum, thereby setting a surface portion of said photoconductive drum which corresponds to said prospective second-color image formation portion at a potential of the first polarity; and a second developing unit disposed in front of said third light source means along the rotational direction of said photoconductive drum to develop the second color image.

9. An apparatus according to claim 8, wherein said second light source means comprises:

means for generating laser beams which have two light amount levels in accordance with the first and second color image data; and means, disposed in front of said second charging means along the rotational direction of said photoconductive drum, for deflecting the laser beams to axially scan said photoconductive drum.

10. An apparatus according to claim 8, wherein said second light source means comprises:
   a plurality of light-emitting diodes axially disposed along said photoconductive drum; and
   means for changing a light amount level of each of said plurality of light-emitting diodes between the two light amount levels in accordance with the first and second color image data.

11. An apparatus according to claim 8, wherein said second light source means comprises:
   an optical fiber tube which has an output end opposing said photoconductive drum; and
   means for changing a light amount level of said optical fiber tube between the two light amount levels in accordance with the first and second color image data.

12. An apparatus according to claim 8, wherein said first charging means and said first light source means are disposed at the same position.

13. An apparatus for forming an n-color image, comprising:
   a photoconductive drum which has a conductive substrate, and a photoconductive layer and a transparent insulating layer sequentially formed on said conductive substrate;
   first charging means disposed at a predetermined position above said photoconductive drum to perform primary charging, thereby producing a carrier of a first polarity on said transparent insulating layer and a carrier of a second polarity in said conductive substrate, and setting said photoconductive drum at a predetermined potential;
   first light source means disposed in front of said first charging means along a rotational direction of said photoconductive drum to expose an entire surface of said photoconductive drum, thereby transferring said carrier of a second polarity from said conductive substrate to said photoconductive layer;
   second charging means disposed in front of said first light source means along the rotational direction of said photoconductive drum to secondarily charge said photoconductive drum at the second polarity;
   second light source means disposed in front of said second charging means along the rotational direction of said photoconductive drum to emit light, an amount of which is controlled to have n levels in accordance with n-color image data, thereby radiating the light onto n prospective color image formation portions of a surface of said photoconductive drum, said second light source means being adapted to invert a potential of a surface portion of said photoconductive drum which corresponds to said prospective first-color image formation portion to the first polarity, and to set remaining surface portions of said photoconductive drum at predetermined potentials of the second polarity;
   a first developing unit disposed in front of said second light source means along the rotational direction of said photoconductive drum to develop the first color image;
   $(k+1)$th $(k=2, \ldots, n)$ light source means disposed in front of a $(k-1)$th developing unit along the rotational direction of said photoconductive drum to perform a kth entire-surface exposure of said photoconductive drum, thereby setting a surface portion of said photoconductive drum which corresponds to a prospective kth-color image formation portion at a potential of the first polarity; and
   a kth developing unit disposed in front of said $(k+1)$th light source means along the rotational direction of said photoconductive drum to develop the kth color image.

14. An apparatus according to claim 13, wherein said second light source means comprises:
   means for generating laser beams which have n light amount levels in accordance with n-color image data; and
   means, disposed in front of said second charging means along the rotational direction of said photoconductive drum, for deflecting the laser beams to axially scan said photoconductive drum.

15. An apparatus according to claim 13, wherein said second light source means comprises:
   a plurality of light-emitting diodes axially disposed along said photoconductive drum; and
   means for changing a light amount level of each of said plurality of light-emitting diodes between the n light amount levels in accordance with the n-color image data.

16. An apparatus according to claim 13, wherein said second light source means comprises:
   an optical fiber tube which has an output end opposing said photoconductive drum; and
   means for changing a light amount level of said optical fiber tube between the n light amount levels in accordance with the n-color image data.

17. An apparatus according to claim 13, wherein said first charging means and said first light source means are disposed at the same position.

18. An apparatus for forming a multicolor image, comprising:
   a photoconductive drum which comprises a conductive substrate, a photoconductive layer of a material having a low barrier at an interface between said conductive substrate and said photoconductive layer, and a transparent insulating layer, said photoconductive layer and said transparent insulating layer being sequentially formed on said conductive substrate;
   first charging means for performing primary charging of a first polarity at a predetermined position of said photoconductive drum so as to produce a carrier of a first polarity on said transparent insulating layer and a carrier of a second polarity in said photoconductive layer, and set said photoconductive drum at predetermined potential;
   second charging means, disposed in front of said first charging means along a rotational direction of said photoconductive drum, for performing secondary charging of a second polarity for said photoconductive drum;
   first light source means, disposed in front of said second charging means along the rotational direction of said photoconductive drum, for emitting light onto said photoconductive drum in accordance with 2-color image data, the light having two light amount levels in accordance with first and second color image data, and said first light source means being adapted to invert a potential of a surface portion of said photoconductive drum which corresponds to a prospective first-color image formation portion to the first polarity, and to set a remaining surface portion of said photoconductive drum at a predetermined potential of the second polarity;
a first developing unit disposed in front of said first light source means along the rotational direction of said photoconductive drum to develop the first color image;
second light source means disposed in front of said first developing unit along the rotational direction of said photoconductive drum to perform an entire-surface exposure of said photoconductive drum, thereby setting a surface portion of said photoconductive drum which corresponds to said prospective second-color image formation portion at a potential of the first polarity; and
a second developing unit disposed in front of said second light source means along the rotational direction of said photoconductive drum to develop the second color image.

* * * * *